United States Patent
Hiroya

(10) Patent No.: US 11,869,529 B2
(45) Date of Patent: Jan. 9, 2024

(54) SPEAKING RHYTHM TRANSFORMATION APPARATUS, MODEL LEARNING APPARATUS, METHODS THEREFOR, AND PROGRAM

(71) Applicant: NIPPON TELEGRAPH AND TELEPHONE CORPORATION, Tokyo (JP)

(72) Inventor: Sadao Hiroya, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 268 days.

(21) Appl. No.: 17/417,749

(22) PCT Filed: Jun. 20, 2019

(86) PCT No.: PCT/JP2019/024438
§ 371 (c)(1),
(2) Date: Jun. 23, 2021

(87) PCT Pub. No.: WO2020/136948
PCT Pub. Date: Jul. 2, 2020

(65) Prior Publication Data
US 2022/0076691 A1    Mar. 10, 2022

(30) Foreign Application Priority Data

Dec. 26, 2018    (JP) ................. 2018-242126

(51) Int. Cl.
*G10L 25/30*    (2013.01)
*G10L 21/0272*    (2013.01)
*G10L 21/057*    (2013.01)

(52) U.S. Cl.
CPC .......... *G10L 25/30* (2013.01); *G10L 21/0272* (2013.01); *G10L 21/057* (2013.01)

(58) Field of Classification Search
CPC ... G10L 25/30; G10L 21/0272; G10L 21/057; G10L 13/00; G10L 15/02; G10L 2015/025; G10L 21/007
See application file for complete search history.

(56) References Cited

U.S. PATENT DOCUMENTS 10,304,477 B2 *    5/2019    van den Oord ........ G06N 3/045
10,510,358 B1 *    12/2019    Barra-Chicote ........ G10L 13/02
(Continued)

FOREIGN PATENT DOCUMENTS

JP    2016218309 A    12/2016
JP    2016218386 A    12/2016

OTHER PUBLICATIONS

Moritz et al. (2015) "A Chime-3 Challenge System: Long-Term Acoustic Features for Noise Robust Automatic Speech Recognition" IEEE Workshop on Automatic Speech Recognition and Understanding, Dec. 13, 2015, pp. 468-474.

*Primary Examiner* — Michael N Opsasnick

(57) ABSTRACT

It is intended to accurately convert a speech rhythm. A model storage unit (10) stores a speech rhythm conversion model which is a neural network that receives, as an input thereto, a first feature value vector including information related to a speech rhythm of at least a phoneme extracted from a first speech signal resulting from a speech uttered by a speaker in a first group, converts the speech rhythm of the first speech signal to a speech rhythm of a speaker in a second group, and outputs the speech rhythm of the speaker in the second group. A feature value extraction unit (11) extracts, from the input speech signal resulting from the speech uttered by the speaker in the first group, information related to a vocal tract spectrum and information related to the speech rhythm. A conversion unit (12) inputs the first feature value vector including the information related to the speech rhythm extracted from the input speech signal to the (Continued)

speech rhythm conversion model and obtains the post-conversion speech rhythm. A speech synthesis unit (13) uses the post-conversion speech rhythm and the information related to the vocal tract spectrum extracted from the input speech signal to generate an output speech signal.

20 Claims, 4 Drawing Sheets

(56) References Cited

U.S. PATENT DOCUMENTS

| | | | |
|---|---|---|---|
| 2013/0238337 A1* | 9/2013 | Kamai | G10L 21/003 |
| | | | 704/258 |
| 2015/0058019 A1* | 2/2015 | Chen | G10L 13/08 |
| | | | 704/260 |
| 2018/0204566 A1 | 7/2018 | Kanda | |
| 2018/0336880 A1* | 11/2018 | Arik | G10L 15/063 |
| 2022/0020355 A1* | 1/2022 | Ming | G10L 13/047 |

* cited by examiner

SPEAKING RHYTHM TRANSFORMATION APPARATUS, MODEL LEARNING APPARATUS, METHODS THEREFOR, AND PROGRAM

CROSS-REFERENCE TO RELATED APPLICATIONS

This application is a U.S. 371 Application of International Patent Application No. PCT/JP2019/024438, filed on 20 Jun. 2019, which application claims priority to and the benefit of JP Application No. 2018-242126, filed on 26 Dec. 2018, the disclosures of which are hereby incorporated herein by reference in their entireties.

TECHNICAL FIELD

This invention relates to a technique of converting a speech rhythm of a speech signal.

BACKGROUND ART

Speech communication using a foreign language is a challenging task for many people. For example, a native speaker of Japanese (hereinafter referred to as the "native Japanese speaker") has such a problem that he or she cannot hear what a native speaker of English (hereinafter referred to as the "native English speaker") says or the native English speaker cannot understand the word he or she said and asks him or her to repeat what was said. Differences between Japanese and English result in suprasegmental features such as a speech rhythm and an intonation, and therefore a technique of automatically converting a speech rhythm of any given English speech uttered by the native Japanese speaker to a speech rhythm easy to hear for the native English speaker has been proposed.

For example, in PTL 1, a speech rhythm is converted using a speech rhythm conversion rule (code book) for time functions which is obtained by a non-negative spatiotemporal decomposition method using a large number of English speeches uttered by native Japanese speakers and native English speakers.

CITATION LIST

Patent Literature

[PTL 1] Japanese Patent Application Publication No. 2016-218386

SUMMARY OF THE INVENTION

Technical Problem

An existing speech rhythm conversion technique basically requires a speech obtained by causing a native speaker to speak the same text as that from which a speech to be converted is generated. By contrast, in the method in PTL 1, a Gaussian mixture model representing the conversion rule for a speech rhythm is learned from respective speeches obtained by causing a native speaker and a non-negative speaker to speak the same text and, by subjecting Gaussian distributions to weighted addition such that the Gaussian mixture model fits best to the speech rhythm of a speech signal to be converted, a post-conversion speech rhythm is obtained. As a result, even when there is no speech obtained by causing a native speaker to speak the same text, a speech rhythm can be converted. However, since the speech rhythms have a non-linear relationship therebetween, a problem arises in that the method in PTL 1 is not sufficient in increasing conversion accuracy.

In view of a technical problem as described above, an object of this invention is to provide a speech rhythm conversion technique which allows a speech rhythm to be accurately converted even when there is no speech signal obtained from the same text as that from which a speech signal to be subjected to speech rhythm conversion is obtained.

Means for Solving the Problem

To solve the problem described above, a speech rhythm conversion device according to a first aspect of this invention includes: a model storage unit that stores a speech rhythm conversion model which is a neural network that receives, as an input thereto, a first feature value vector including information related to a speech rhythm of at least a phoneme extracted from a first speech signal resulting from a speech uttered by a speaker in a first group, converts the speech rhythm of the first speech signal to a speech rhythm of a speaker in a second group, and outputs the speech rhythm of the speaker in the second group; a feature value extraction unit that extracts, from an input speech signal resulting from the speech uttered by the speaker in the first group, information related to a vocal tract spectrum and information related to the speech rhythm; a conversion unit that inputs the first feature value vector including the information related to the speech rhythm extracted from the input speech signal to the speech rhythm conversion model and obtains the post-conversion speech rhythm; and a speech synthesis unit that uses the post-conversion speech rhythm and the information related to the vocal tract spectrum extracted from the input speech signal to generate an output speech signal.

To solve the problem described above, a model learning device according to a second aspect of this invention includes: a training data storage unit that stores training data including a pair of a first feature value vector including information related to a speech rhythm of at least a phoneme extracted from a first speech signal resulting from a speech uttered by a speaker in a first group and information related to a speech rhythm extracted from a second speech signal resulting from a speech uttered by a speaker in a second group; and a learning unit that learns, using the training data, a neural network that receives, as an input thereto, the first feature value vector extracted from the first speech signal, converts the speech rhythm of the first speech signal to the speech rhythm of the speaker in the second group, and outputs the speech rhythm of the speaker in the second group.

Effects of the Invention

According to this invention, the speech rhythm is converted using the neural network learned in advance to allow the speech rhythm to be accurately converted even when there is no speech signal obtained from the same text as that from which a speech signal to be subjected to speech rhythm conversion is obtained.

DESCRIPTION OF EMBODIMENTS

Figure 1:
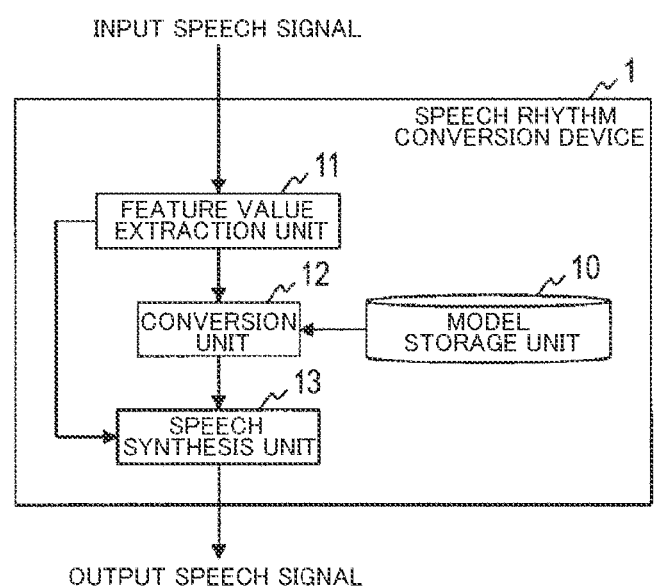
FIG. 1 is a diagram illustrating an example of a functional configuration of a speech rhythm conversion device.

A detailed description will be given below of embodiments of this invention. Note that, in the drawings, components having the same functions are given the same reference numerals, and repeated descriptions thereof are omitted.

First Embodiment

A first embodiment of this invention is a speech rhythm conversion device that converts, using a neural network (hereinafter referred to as the "speech rhythm conversion model") learned in advance, a speech signal obtained from a speaker in a first group to a speech rhythm of a speaker in a second group, a method therefor, a model learning device that learns, using training data collected in advance, the speech rhythm conversion model used by the speech rhythm conversion device and method, and a method therefor. The first group refers to, e.g., a native speaker of a first language (e.g., Japanese) (hereinafter referred to as the "native Japanese speaker"). The second group refers to, e.g., a native speaker of a second language (e.g., English) (hereinafter referred to as the "native English speaker").

<Speech Rhythm Conversion>

Figure 2:
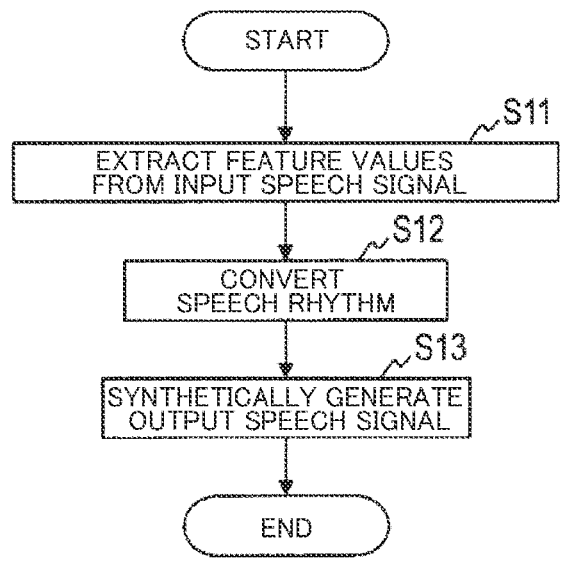
FIG. 2 is a diagram illustrating an example of a processing procedure in a speech rhythm conversion method.

As illustrated by way of example in FIG. 1, a speech rhythm conversion device 1 in the first embodiment includes a model storage unit 10, a feature value extraction unit 11, a conversion unit 12, and a speech synthesis unit 13. The speech rhythm conversion device 1 performs processing in each of steps illustrated by way of example in FIG. 2 to provide the speech rhythm conversion method in the first embodiment.

The speech rhythm conversion device 1 is a special device configured to include a known or dedicated computer having, e.g., a central processing unit (CPU), a main memory (RAM: Random Access Memory), and the like in which a special program is read. The speech rhythm conversion device 1 performs each processing under the control of, e.g., the central processing unit. Data input to the speech rhythm conversion device 1 and data obtained in each processing are stored in, e.g., the main memory. The data stored in the main memory is read as required into the central processing unit to be used for another processing. Each of the processing units of the speech rhythm conversion device 1 may also have at least a portion thereof formed of hardware such as an integrated circuit. Each of the storage units included in the speech rhythm conversion device 1 can be formed of, e.g., the main memory such as the RAM (Random Access Memory), an auxiliary memory formed of a hard disk, an optical disc, or a semiconductor memory element such as a flash memory, or middleware such as a relational database or a key-value store.

In the model storage unit 10, a preliminarily learned speech rhythm conversion model is stored. The speech rhythm conversion model is a neural network that receives, as an input thereto, a feature value vector extracted from the speech signal including a speech uttered by the speaker in the first group, converts a speech rhythm of the speaker in the first group to the speech rhythm of the speaker in the second group, and outputs the speech rhythm of the speaker in the second group. The speech rhythm conversion model is learned in advance by deep learning using a data set (hereinafter referred to as the "training data") including a pair of a "first speech signal" and a "second speech signal". The "first speech signal" mentioned above is a speech signal including a speech uttered in the second language by the speaker in the first group. The "second speech signal" mentioned above is a speech signal including a speech uttered in the second language by the speaker in the second group. The training data is a sufficient amount of data including, e.g., a pair of a speech signal resulting from a speech uttered in English by the native Japanese speaker and a speech signal resulting from speaking of the same text in English by the native English speaker.

As the neural network, a perceptron (MLP: Multi Layer Perceptron) including, e.g., five layers and 512 units, a convolutional neural network (CNN) including, e.g., five layers and 512 filters, or the like may be used appropriately. When the convolutional neural network is used, the filters may appropriately be e.g., (10, 2), (8, 1), (6, 1), (3, 1), and (1, 2) listed in this order from an input side.

In Step S11, the feature value extraction unit 11 extracts, for each of frames, feature values from the first speech signal (hereinafter referred to as the "input speech signal") input to the speech rhythm conversion device 1 and generates the feature value vectors including the feature values. The feature value extraction unit 11 outputs the extracted feature value vectors to the conversion unit 12 and to the speech synthesis unit 13.

Specifically, the feature value extraction unit 11 decomposes the input speech signal into information related to a vocal tract spectrum and information related to the speech rhythm, and outputs the first feature value vector including the information related to the speech rhythm to the conversion unit 12, while outputting the second feature value vector including the information related to the vocal tract spectrum to the speech synthesis unit 13.

The feature value vector (hereinafter referred to as the "first feature value vector") output to the conversion unit 12 includes speech rhythm information ($\Phi'_{1,t}$, $D_{1,t}$) corresponding to at least a phoneme $p_t$ to be converted. Note that t is a number of the phoneme included in the input speech signal. To obtain the speech rhythm information, e.g., a method described in paragraphs [0011] to [0027] in PTL 1 can be used. The feature values to be extracted may further include, in addition to the speech rhythm information ($\Phi'_{1,t}$, $D_{1,t}$), known feature values related to the speech signal such as mel-frequency cepstrum coefficients (MFCC) at a time (a time which most accurately represents the phoneme) when the phoneme $p_t$ is driven and a fundamental frequency F0.

The first feature value vector to be generated is a vector in which feature values for a predetermined number of consecutive phonemes are arranged. For example, when it is assumed that feature values of the phoneme $p_t$ to be subjected to conversion are (($\Phi'_{1,t}$, $D_{1,t}$), $MFCC_{1,t}$, $F0_{1,t}$), the feature value vector can be represented by ($\Phi'_{1,t-1}$, $\Phi'_{1,t}$, $\Phi'_{1,t+1}$, $D_{1,t-1}$, $D_{1,t}$, $D_{1,t+1}$, $MFCC_{1,t-1}$, $MFCC_{1,t}$, $MFCC_{1,t+1}$, $Flag_{1,t-1}$, $F0_{1,t}$-1, $Flag_{1,t}$, $F0_{1,t}$, $Flag_{1,t+1}$, $F0_{1,t+1}$)$^T$, which is an arrangement of three consecutive phonemes $p_{t-1}$, $p_t$, and $p_{t+1}$. It is assumed herein that $\cdot^T$ (superscript T) represents a transposition of a matrix or a vector, and Flag is information representing either a voiced sound or a voiceless sound. For example, when a sound is voiced, 1 is set while, when a sound is voiceless, 0 is set.

The feature value extraction unit 11 extracts the first feature value vector including elements illustrated in Table 1. In Table 1, a first row represents types (attributes) of the elements, a second row represents numbers of the phonemes from which the elements are extracted, and a third row represents orders of the elements.

TABLE 1

| $\Phi'_J$ | $\Phi'_J$ | $\Phi'_J$ | $D_J$ | $D_J$ | $D_J$ | MFCC | MFCC | MFCC | Flag | F0 | Flag | F0 | Flag | F0 |
|---|---|---|---|---|---|---|---|---|---|---|---|---|---|---|
| t−1 | t | t+1 | t−1 | t | t+1 | t−1 | t | t+1 | t−1 | t−1 | t | t | t+1 | t+1 |
| 8th Order | 8th Order | 8th Order | 1st Order | 1st Order | 1st Order | 13th Order | 13th Order | 13th Order | 1st Order | 1st Order | 1st Order | 1st Order | 1st Order | 1st Order |

It is assumed that $\Phi'_J$ is obtained by subjecting a time function sampled from a native Japanese speaker to 10-point sampling. However, since 1st-order and 10th-order (final-order) values of $\Phi'_J$ are constantly 0.5, the 1st-order and 10th-order values of $\Phi'_J$ are removed from the first feature value vector. $D_J$ is a duration length of a phoneme. MFCC is a mel-cepstral frequency extracted from a speech signal used in speech recognition or the like. It is assumed that the mel-cepstral frequency is analyzed in a 13th order, and the 13th order from which a 0th-order term (gain) is removed is used. It is assumed that F0 is obtained by normalization performed by complementing a voiceless value, taking a logarithm of Hz, and subtracting an average value from the resulting value. It is assumed that Flag represents flag information in which 1 represents a voiced sound and 0 represents a voiceless sound. In this example, the first feature value vector for the input speech signal is a 72th-order vector.

When the speech rhythm conversion model is formed of a multi-layer perceptron (MLP), the 72th-order vector is input to the conversion unit 12. When the speech rhythm conversion model is formed of the convolutional neural network (CNN), a 24×3 matrix including a 24th-order vector $(\Phi'_{1,t-1}, D_{1,t-1}, MFCC_{1,t-1}, Flag_{1,t-1}, F0_{1,t-1})^T$ related to the immediately previous phoneme $p_{t-1}$, a 24th-order vector $(\Phi'_{1,t}, D_{1,t}, MFCC_{1,t}, Flag_{1,t}, F0_{1,t})^T$ related to the current phoneme $p_t$, and a 24th-order vector $(\Phi'_{1,t+1}, D_{1,t+1}, MFCC_{1,t+1}, Flag_{1,t+1}, F0_{1,t+1})^T$ related to the immediately subsequent phoneme $p_{t+1}$ is input to the conversion unit 12.

The feature value vector (hereinafter referred to as the "second feature value vector") output to the speech synthesis unit 13 is the information related to the vocal tract spectrum which is, e.g., an LSP parameter sequence. In the method described in [0011] to [0027] in PTL 1, the LSP parameter sequence $Y(t)=\{y_1(t), \ldots, y_i(t), \ldots, y_p(t)\}$ for a time-series signal $Y(t)$ serving as the input speech signal where p is the total number of analysis orders of LSP parameters, i is an index representing the analysis order, and t is an index representing a time is obtained. Accordingly, the LSP parameter sequence $Y(t)=\{y_1(t), \ldots, y_i(t), \ldots, y_p(t)\}$ may be used appropriately as the second feature value vector.

In Step S12, the conversion unit 12 receives, from the feature value extraction unit 11, the first feature value vector of the input speech signal and inputs the first feature value vector to the speech rhythm conversion model stored in the model storage unit 10 to obtain post-conversion speech rhythm information $(\Phi'_{2,t}, D_{2,t})$ resulting from conversion of the speech rhythm of the input speech signal to the speech rhythm of the speaker in the second group. The conversion unit 12 outputs the obtained post-conversion speech rhythm information $(\Phi'_{2,t}, D_{2,t})$ to the speech synthesis unit 13.

When receiving, as an input thereto, the 72th-order first feature value vector described above, the conversion unit 12 converts $\Phi_E$ to the time function obtained by subjecting a time function sampled from the native English speaker to 20-point sampling, and outputs a 21st-order vector including elements illustrated in Table 2.

TABLE 2

| $\Phi'_E$ | $D_E$ | Flag | F0 |
|---|---|---|---|
| t | t | t | t |
| 18th Order | 1st Order | 1st Order | 1st Order |

In Step S13, the speech synthesis unit 13 receives the second feature value vector of the input speech signal from the feature value extraction unit 11, while receiving the post-conversion speech rhythm information $(\Phi'_{2,t}, D_{2,t})$ from the conversion unit 12. Then, using the second feature value vector of the input speech signal and the post-conversion speech rhythm information $(\Phi'_{2,t}, D_{2,t})$, the speech synthesis unit 13 synthetically generates an output speech signal resulting from the conversion of the speech rhythm of the input speech signal to the speech rhythm of the speaker in the second group and outputs the output speech signal. For processing for speech synthesis, a method described in, e.g., paragraphs [0048] to [0054] in PTL 1 can be used.

<Model Learning>

Figure 3:
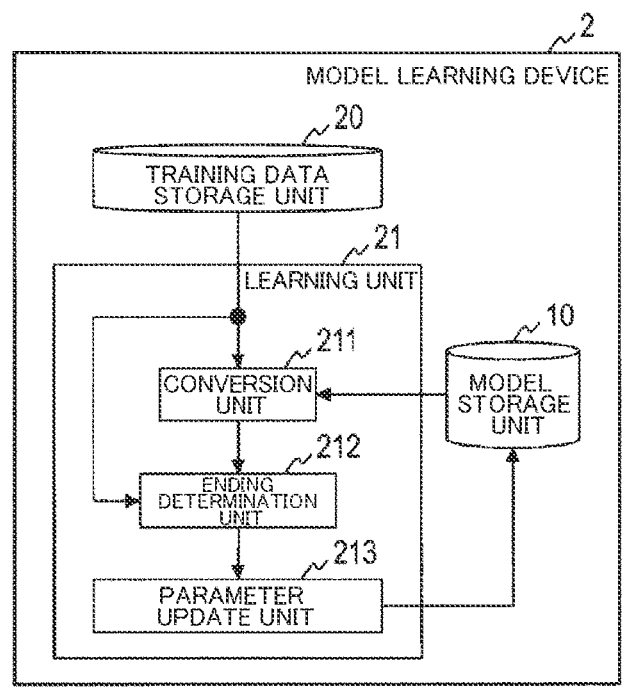
FIG. 3 is a diagram illustrating an example of a functional configuration of a model learning device.
Figure 4:
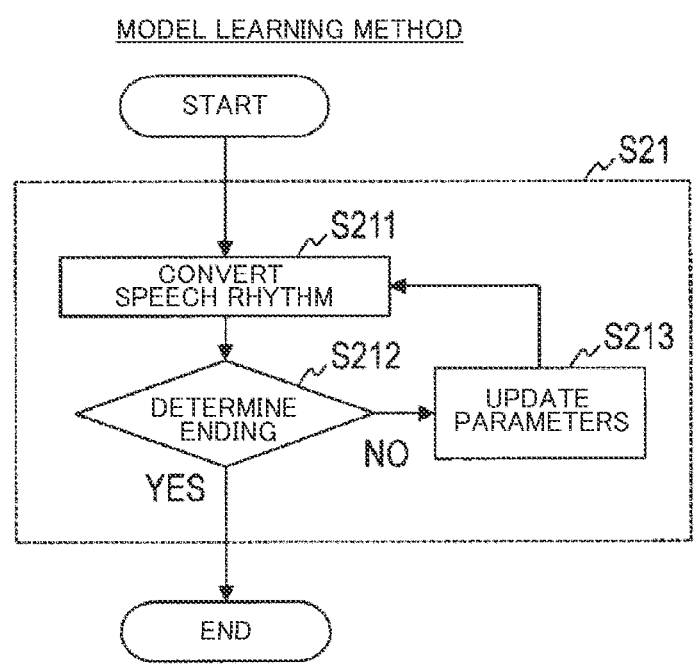
FIG. 4 is a diagram illustrating an example of a processing procedure in a model learning method.

The model learning device 2 in the first embodiment includes a model storage unit 10, a training data storage unit 20, and a learning unit 21, as illustrated by way of example in FIG. 3. The learning unit 21 includes a conversion unit 211, an ending determination unit 212, and a parameter update unit 213. The model learning device 2 performs processing in each of steps illustrated by way of example in FIG. 4 to implement a model learning method in the first embodiment.

The model learning device 2 is a special device configured to include a known or dedicated computer having, e.g., a central processing unit (CPU), a main memory (RAM: Random Access Memory), and the like in which a special program is read. The model learning device 2 performs each processing under the control of, e.g., the central processing unit. Data input to the model learning device 2 and data obtained in each processing are stored in, e.g., the main memory. The data stored in the main memory is read as required into the central processing unit to be used for another processing. Each of the processing units of the model learning device 2 may also have at least a portion thereof formed of hardware such as an integrated circuit. Each of the storage units included in the model learning device 2 can be formed of, e.g., the main memory such as the RAM (Random Access Memory), an auxiliary memory formed of a hard disk, an optical disc, or a semiconductor memory element such as a flash memory, or middleware such as a relational database or a key-value store. Each of the storage units included in the model learning device 2 may be logically divided appropriately or the training data may also be stored in one physical storage device.

In the training data storage unit 20, the training data collected in advance is stored. The training data is a data set including the pair of the first feature value vector including the information related to the speech rhythm extracted from the first speech signal and the information related to the speech rhythm extracted from the second speech signal. The training data is a sufficient amount of data including a pair of, e.g., the first feature value vector of a speech signal resulting from a speech uttered in English by the native Japanese speaker and information related to a speech rhythm of a speech signal resulting from speaking of the same text in English by the native English speaker. It is assumed that the types (attributes) of feature values included in the first feature value vector are the same as those of feature values extracted by the feature value extraction unit 11 of the speech rhythm conversion device 1. The training data may also be a very speech signal, not a feature value vector extracted in advance. In that case, the model learning device 2 may be configured appropriately to include a feature value extraction unit that extracts a feature value vector from each speech signal of the training data.

In Step S21, the learning unit 21 learns, using the training data stored in the training data storage unit 20, a neural network that receives, as an input thereto, the first feature value vector extracted from the first speech signal, converts a speech rhythm of the first speech signal to a speech rhythm of the speaker in the second group, and outputs the speech rhythm of the speaker in the second group. The learning unit 21 stores parameters of the learned neural network as a speech rhythm conversion model in the model storage unit 10.

Specifically, the learning of the neural network is performed as follows.

In Step S211, the conversion unit 211 inputs the first feature value vector of the first speech signal in the training data to the neural network in which an appropriate initial value is set in advance and determines an estimated value of the post-conversion speech rhythm information.

In Step S212, the ending determination unit 212 determines whether or not a predetermined ending condition is satisfied. When the ending condition is satisfied (YES), the learning is ended. When the ending condition is not satisfied (NO), Step S213 is performed, and then Step S211 is performed again. As the predetermined ending condition, such a state that a preset number of repetitions is reached, an error between the estimated value of the speech rhythm information and correct solution data becomes equal to or less than a predetermined threshold, or an amount of parameter update becomes equal to or less than a predetermined threshold may be used appropriately.

In Step S213, the parameter update unit 213 updates each of the parameters of the neural network on the basis of a result of comparison between the estimated value of the speech rhythm information determined by the conversion unit 211 and the speech rhythm information (correct solution data) of the second speech signal in the training data which corresponds to the input first feature value vector. The parameter update may be performed appropriately in accordance with a known error propagation learning method or the like. For example, the parameters are updated (learned) so as to minimize a mean square error between the estimated value of the speech rhythm information and the correct solution data.

The learning unit 21 stores, in the model storage unit 10, the parameters of the neural network when the learning is ended. The model learning device 2 may also be configured appropriately to output the parameters of the learned neural network such that the parameters are stored directly in the speech rhythm conversion device 1 and not to include the model storage unit 10. Using the neural network of which the learned parameters are set as the speech rhythm conversion model, the conversion unit 12 of the speech rhythm conversion device 1 performs the processing described in the first embodiment.

Second Embodiment

In the first embodiment, the time function of the set of three phonemes of the native Japanese speaker is converted to the time function of the middle phoneme of the set of three phonemes of the native English speaker. By contrast, in a second embodiment, a speech rhythm conversion model is configured so as to convert the entire time function of the native Japanese speaker to the entire time function of the native English speaker. While the speech rhythm conversion model in the first embodiment is formed of the multi-layer perceptron (MLP) or the convolutional neural network (CNN), the speech rhythm conversion model in the second embodiment is formed of a recurrent neural network (RNN).

In the first embodiment, local conversion using the set of three phonemes is performed. However, the speech rhythm is a suprasegmental feature, and local approximation is insufficient. Meanwhile, in the existing technique, stammering and verbal slip-ups included in an English speech of the native Japanese Speaker are represented by another model and removed, when not required, from the time function. However, this method has a problem in that the time function is discrete. Accordingly, the second embodiment uses a recurring neural network capable of handling a time series and widely used in natural language processing and speech processing for conversion of the time function to thus allow the time function to be estimated, while giving consideration to the entire speech. In addition, since another model is not required with regard to the stammering and verbal slip-ups, it is possible to perform more natural speech rhythm conversion.

<Speech Rhythm Conversion>

The feature value extraction unit 11 in the second embodiment extracts, from an input speech signal, a first feature value vector including information related to a speech rhythm and a second feature value vector including information related to a vocal tract spectrum. Speech rhythm information obtained from each phoneme is the same as in the first embodiment, but it is assumed that the first feature value vector to be generated is a vector sequence in which feature values for all the input phonemes (i.e., the entire speech) are combined.

Since the speech rhythm conversion model in the second embodiment is formed of the recurrent neural network, a feature value vector related to the given phoneme $p_t$ includes only feature values of one phoneme to result in, e.g., a 24th-order vector including elements illustrated in Table 3.

TABLE 3

| $\Phi'_J$ | $D_J$ | MFCC | Flag | F0 |
|---|---|---|---|---|
| t | t | t | t | t |
| 8th Order | 1st Order | 13th Order | 1st Order | 1st Order |

To give consideration to stammering and verbal slip-ups by the native Japanese speaker or the like, the feature value extraction unit 11 in the second embodiment may also extract not only the speech rhythm information, but also phoneme classification information and cause the first feature value vector to include the phoneme classification information as well as the speech rhythm information. The phoneme classification information is information such that, e.g., starting of a speech is set to 0, ending of the speech is set to 1, a short pause is set to 2, and unrequired anaptyxis is set to 3.

The conversion unit 12 in the second embodiment inputs a first feature value vector to the speech rhythm conversion model and obtains post-conversion rhythm information resulting from conversion of a speech rhythm of an input speech signal to a speech rhythm of a speaker in a second group. The post-conversion speech rhythm information obtained for each of the phonemes is the same as in the first embodiment. For example, an output vector from the speech rhythm conversion model corresponding to a 21st-order vector including the elements illustrated in Table 2 is a vector sequence in which feature values for all the phonemes (i.e., the entire speech) are combined.

The second feature value vector generated by the feature value extraction unit 11 and input to the speech synthesis unit 13 and processing by the speech synthesis unit 13 are the same as in the first embodiment.

<Model Learning>

Training data used in the second embodiment is parallel data resulting from, e.g., speaking of the same English sentence (such as, e.g., "I have a pen") by a native Japanese speaker and a native English speaker, in the same manner as in the first embodiment. Although the same English sentence is spoken, the English speech by the native Japanese speaker includes the stammering and the verbal slip-ups. Accordingly, in the second embodiment, a sequence-to-sequence model (Seq2Seq) with an attention mechanism (attention) capable of processing non-parallel data is used. The attention mechanism indicates a time in an encoder on which attention is to be focused to allow a decoder to deduce. In rhythm conversion, the time in the encoder and the time in the decoder are substantially diagonal, and therefore "Guided Attention Loss" (see Reference Literature 1) is used by way of example. This allows the stammering, the verbal slip-ups, and the like to be skipped. A network structure is built with reference to Tacotron 2 (see Reference Literature 2) used for speech synthesis or the like. Note that the number of phonemes in the input vector need not necessarily be equal to that in the output vector.

[Reference Literature 1] Tachibana, Hideyuki & Uenoyama, Katsuya & Aihara, Shunsuke. (2017). Efficiently Trainable Text-to-Speech System Based on Deep Convolutional Networks with Guided Attention.

[Reference Literature 2] Shen, J.; Pang, R.; Weiss, R. J.; Schuster, M.; Jaitly, N.; Yang, Z.; Chen, Z.; Zhang, Y.; Wang, Y.; Skerrv-Ryan, R.; et al. Natural TTS Synthesis by Conditioning Wavenet on MEL Spectrogram Predictions. In Proceedings of the 2018 IEEE International Conference on Acoustics, Speech and Signal Processing (ICASSP), Calgary, AB, Canada, 12-17 May 2018; pp. 4779-4783. doi:10.1109/ICASSP.2018.8461368.

As an objective function for training, e.g., $|\hat{Y}-Y|_2+|\hat{P}-P|_2+wGAL$ is used, and a network is trained so as to minimize the objective function. In the objective function, Y is a feature value vector illustrated in Table 3, P is the phoneme classification information, and ^ represents an estimated value. Meanwhile, GAL represents Guided Attention Loss corresponding to $W_{nt}$ seen in Chapter 4.1 in Reference Literature 1, and w is a weight which is set to, e.g., 10000. Instead of $|\hat{P}-P|_2$, entropy for P may also be used.

[Modification]

To the first feature value vector to be input to the speech rhythm conversion model, a gain (voice volume), a phoneme, an articulatory feature, or the like may also be added.

In the first embodiment, the 3-element set of the phoneme $p_t$ to be converted and the phonemes $p_{t-1}$ and $p_{t+1}$ before and after the phoneme $p_t$ is included in the first feature value vector. However, a 5-element set of phonemes $p_{t-2}$, $p_{t-1}$, $p_t$, $p_{t+1}$, $p_{t+2}$ may also be included in the first feature value vector.

It may also be possible for the speech synthesis unit 13 of the speech rhythm conversion device 1 to synthetically generate the post-conversion speech signal by converting an intonation of the input speech signal by using the fundamental frequency F0 of the output vector.

The embodiment described above has described the example in which the speech rhythm conversion device 1 and the model learning device 2 are configured as separate devices. However, it may also be possible to configure one speech rhythm learning device including all the functions to be included in the speech rhythm conversion device 1 and the model learning device 2. In other words, it is also possible to configure a speech rhythm conversion device including the model storage unit 10, the feature value extraction unit 11, the conversion unit 12, the speech synthesis unit 13, the training data storage unit 20, and the learning unit 21.

It is known that, even when a neural network is used, fluctuations in the time function and F0 each resulting from the conversion performed by the first and second embodiments are smaller than human-derived equivalents and do not result in a natural synthesized speech. By using an generative adversarial network (GAN) in Reference Literature 3, it is also possible to solve this problem.

[Reference Literature 3] Y. Saito, S. Takamichi and H. Saruwatari, "Statistical Parametric Speech Synthesis Incorporating Generative Adversarial Networks", in IEEE/ACM Transactions on Audio, Speech, and Language Processing, vol. 26, no. 1, pp. 84-96, January 2018

While the description has been given heretofore of the embodiments of this invention, a specific configuration is not limited to these embodiments. It will be appreciated that, even when there is a design change or the like as required within a scope not departing from a gist of this invention, such a change is to be included in this invention. Various processing described in the embodiments may be not only performed in time series in order of description, but also performed in parallel or individually depending on a processing ability of a device that performs the processing or as required.

[Program, Recording Medium]

When various processing functions in each of the devices described in the foregoing embodiments are to be implemented by a computer, processing details of the functions to be provided in the individual devices are described using a program. Then, by causing the computer to execute this program, the various processing functions in the individual devices are implemented on the computer.

The program used to describe the processing details can be recorded on a computer readable recording medium. The computer readable recording medium may be any such as, for example, a magnetic recording device, an optical disc, a magneto-optical recording medium, and a semiconductor memory.

This program is distributed by, e.g., selling, transferring, or lending a portable recording medium on which the program is recorded, such as a DVD or a CD-ROM. This program may also be configured to be stored in a storage device of a server computer and transferred from the server computer to another computer to be distributed.

For example, a computer which executes such a program first temporarily stores the program recorded on the portable recording medium or the program transferred from the server computer in a storage device of the computer. Then, when processing is to be performed, this computer reads the program stored in the storage device thereof and performs processing in accordance with the read program. In another mode of execution of this program, it may also be possible for the computer to read the program directly from the portable recording medium and perform processing in accordance with the program. Alternatively, it may also be possible that, every time the program is transferred from the server computer to this computer, the computer subsequently performs processing in accordance with the received program. Still alternatively, this computer may also be configured to perform the processing described above via a so-called ASP (Application Service Provider) type service which implements a processing function only with an instruction to execute the program and through acquisition of a result without involving transfer of the program from the server computer to this computer. It is assumed that the program in the present embodiment includes information (such as data which is not a direct instruction to the computer, but has a property of defining processing to be performed by the computer) to be provided for processing by an electronic calculator, which is equivalent to a program.

In this mode, the present device is configured by causing the predetermined program to be executed on the computer. However, it may also be possible to cause at least a portion of such processing details to be implemented using hardware.

The invention claimed is:

1. A speech rhythm conversion device comprising:
    a model store configured to store a speech rhythm conversion model which is a neural network that:
        receives, as an input thereto, a first feature value vector including first data associated with a speech rhythm of at least a phoneme extracted from a first speech signal resulting from a speech uttered by a speaker in a first group;
        converts the speech rhythm of the first speech signal to a speech rhythm of a speaker in a second group, and outputs the speech rhythm of the speaker in the second group;
    a feature value extractor configured to extract, from an input speech signal resulting from the speech uttered by the speaker in the first group, second data associated with a vocal tract spectrum and the first data associated with the speech rhythm;
    a convertor configured to receive the first feature value vector including the first data associated with the speech rhythm extracted from the input speech signal to the speech rhythm conversion model and obtain the post-conversion speech rhythm; and
    a speech synthesizer configured to use the post-conversion speech rhythm and the first data associated with the vocal tract spectrum extracted from the input speech signal to generate an output speech signal.

2. The speech rhythm conversion device according to claim 1, wherein the first feature value vector further includes the first data associated with the speech rhythm of a plurality of the sequentially consecutive phonemes.

3. The speech rhythm conversion device according to claim 1, wherein the first feature value vector includes at least one of a gain of voice and an articulatory feature.

4. The speech rhythm conversion device according to claim 1, wherein the speech synthesizer generates the output speech signal based on an intonation of the input speech signal using a fundamental frequency associated with the output speech signal.

5. The speech rhythm conversion device according to claim 1, wherein the speaker in the first group includes a native speaker of a first language, wherein the speaker in the second group includes a native speaker of a second language, and wherein the first language is distinct from the second language.

6. The speech rhythm conversion device according to claim 1, wherein the neural network includes a convolutional neural network.

7. The speech rhythm conversion device according to claim 1, wherein the neural network includes a recursive neural network.

8. A model learning device comprising:
    a training data store configured to store training data including a pair of a first feature value vector including first data associated with a speech rhythm of at least a phoneme extracted from a first speech signal resulting from a speech uttered by a speaker in a first group and second data associated with a speech rhythm extracted from a second speech signal resulting from a speech uttered by a speaker in a second group; and
    a learner configured to learn, using the training data, a neural network that receives, as an input thereto, the first feature value vector extracted from the first speech signal, converts the speech rhythm of the first speech signal to the speech rhythm of the speaker in the second group, and outputs the speech rhythm of the speaker in the second group.

9. The model learning device according to claim 8, wherein the first feature value vector further includes information related to the speech rhythm of a plurality of the sequentially consecutive phonemes.

10. The model learning device according to claim 8, wherein the first feature value vector includes at least one of a gain of voice and an articulatory feature.

11. The model learning device according to claim 8, wherein the speech synthesizer generates the output speech signal based on an intonation of the input speech signal using a fundamental frequency associated with the output speech signal.

12. The model learning device according to claim 8, wherein the speaker in the first group includes a native speaker of a first language, wherein the speaker in the second group includes a native speaker of a second language, and wherein the first language is distinct from the second language.

13. The model learning device according to claim 8, wherein the neural network includes a recursive neural network.

14. A speech rhythm conversion method, the method comprising:
    storing, by a model store, a speech rhythm conversion model which is a neural network that receives, as an input thereto, a first feature value vector including the first data associated with a speech rhythm of at least a phoneme extracted from a first speech signal resulting from a speech uttered by a speaker in a first group;

converting, by the model store, the speech rhythm of the first speech signal to a speech rhythm of a speaker in a second group;

providing, by the model store, the speech rhythm of the speaker in the second group;

extracting, by a feature value extractor, from an input speech signal resulting from the speech uttered by the speaker in the first group, second data associated with a vocal tract spectrum and the first data associated with the speech rhythm;

receiving, by a convertor, the first feature value vector including the the speech rhythm extracted from the input speech signal to the speech rhythm conversion model;

obtaining, by the convertor, the post-conversion speech rhythm; and generating, by a speech synthesizer, an output speech signal using the post-conversion speech rhythm and the second data associated with the vocal tract spectrum extracted from the input speech signal.

15. The speech rhythm conversion method according to claim 14, wherein the first feature value vector further includes information related to the speech rhythm of a plurality of the sequentially consecutive phonemes.

16. The speech rhythm conversion method according to claim 14, wherein the first feature value vector includes at least one of a gain of voice and an articulatory feature.

17. The speech rhythm conversion method according to claim 14, wherein the speech synthesizer generates the output speech signal based on an intonation of the input speech signal using a fundamental frequency associated with the output speech signal.

18. The speech rhythm conversion method according to claim 14, wherein the neural network includes a recursive neural network.

19. The speech rhythm conversion method according to claim 14, the method further comprising:

storing, by a training data store training data including a pair of the first feature value vector including third data associated with the speech rhythm of at least the phoneme extracted from the first speech signal resulting from the speech uttered by the speaker in the first group and fourth data associated with the speech rhythm extracted from a second speech signal resulting from the speech uttered by the speaker in the second group; and learning, by a learner, using the training data, the neural network that receives, as an input thereto, the first feature value vector extracted from the first speech signal;

converting, by the learner, the speech rhythm of the first speech signal to the speech rhythm of the speaker in the second group, and providing, by the learner, the speech rhythm of the speaker in the second group.

20. The speech rhythm conversion method according to claim 19, wherein the first feature value vector further includes information related to the speech rhythm of a plurality of the sequentially consecutive phonemes.

* * * * *